United States Patent [19]
Otzen

[11] 3,960,728
[45] June 1, 1976

[54] DISPOSABLE FILTER APPARATUS
[75] Inventor: Karl G. Otzen, Brookfield, Wis.
[73] Assignee: Safety-Kleen Corporation, Elgin, Ill.
[22] Filed: Mar. 12, 1975
[21] Appl. No.: 557,499

[52] U.S. Cl.................................. 210/167; 4/291;
134/111; 229/DIG. 14; 229/53
[51] Int. Cl.²................. B01D 23/04; B65D 29/04
[58] Field of Search.............. 210/167, 164; 4/290,
4/291, 292; 206/46 F; 229/DIG. 14, 53;
134/40, 25 R, 111; 55/380, 370

[56] References Cited
UNITED STATES PATENTS

| | | | |
|---|---|---|---|
| 383,327 | 5/1888 | Staw | 229/DIG. 14 |
| 1,127,301 | 2/1915 | Smith | 4/291 |
| 1,313,153 | 8/1919 | Zboyan | 4/291 |
| 1,529,833 | 3/1925 | Essick | 210/248 |
| 1,783,460 | 12/1950 | Brotz | 4/291 |
| 1,950,817 | 3/1934 | Rossman | 4/291 |
| 2,225,389 | 12/1940 | Osterdahl | 229/DIG. 14 |
| 2,663,428 | 12/1953 | Hoagland | 210/248 |
| 2,688,914 | 9/1954 | Eckler | 229/DIG. 14 |
| 3,091,339 | 5/1963 | Marra et al. | 4/290 X |
| 3,430,767 | 3/1969 | Lawalin et al. | 210/167 |

Primary Examiner—Theodore A. Granger
Attorney, Agent, or Firm—James T. FitzGibbon

[57] ABSTRACT

A disposable filter unit for use with a parts washer or the like. The filter consists of a body in the general form of a bag, made from a softenable but substantially solvent-impermeable thermoplastic material having a neck portion attached to a mounting collar. The mounting collar is a stiff but resilient element suitable for being positioned and retained within the drain opening of the parts washer, being constantly held in place by a cup or screen. The filter body has large by-pass openings in the neck, smaller openings in the upper body portion and still smaller openings in the lowermost portion. The filter acts by trapping sharp-edged or jagged particles such as slivers and filings, both on the interior surface of the bag and within the openings. Entrapment of the filtered material effectively creates a finer mesh filter, and the graduated opening sizes provide a combination filtration and settling action.

5 Claims, 5 Drawing Figures

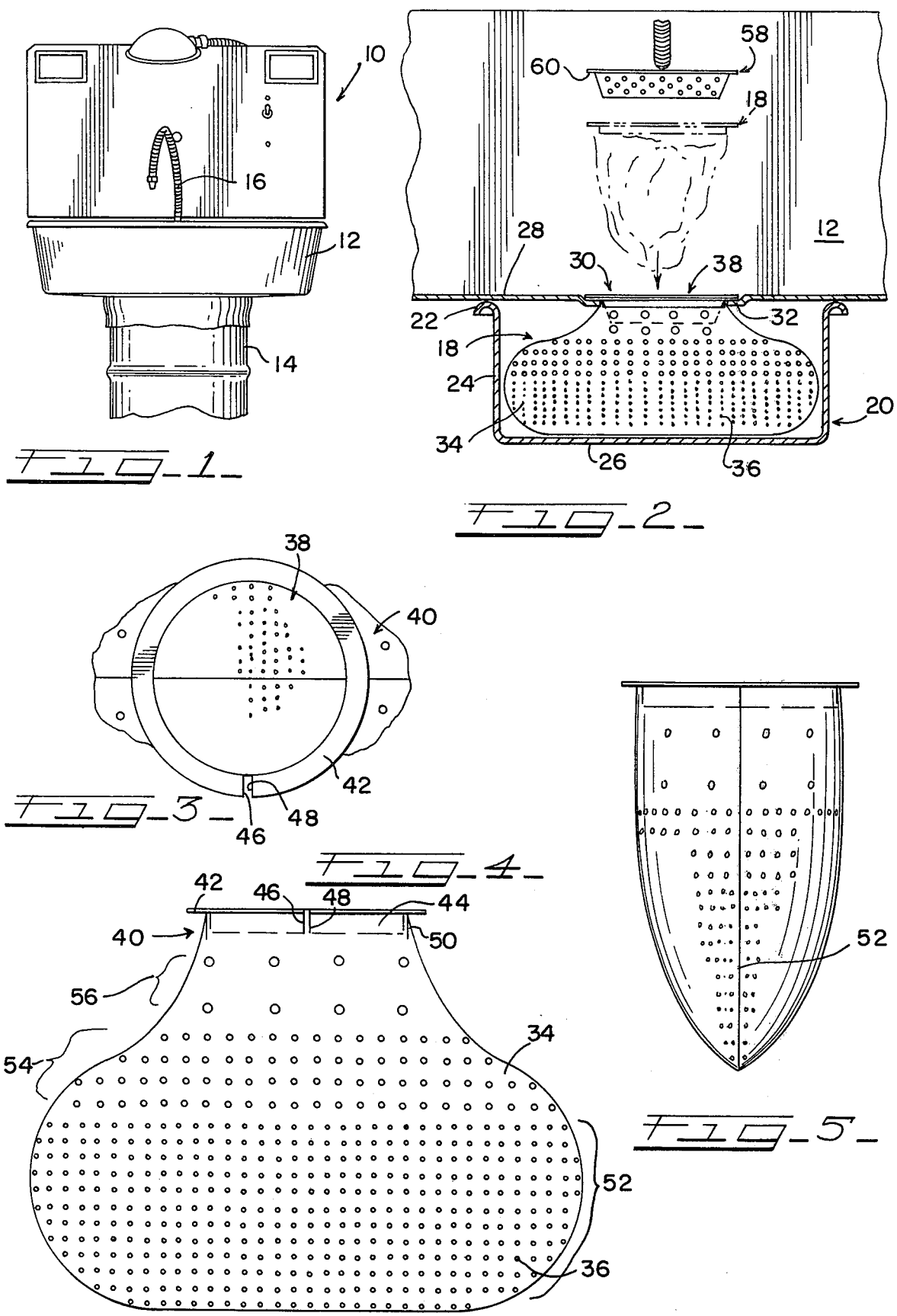

DISPOSABLE FILTER APPARATUS

BACKGROUND OF THE INVENTION

The present invention relates generally to filters, and more particularly, to a disposable filter which is adapted to retain contaminant material of a certain particle size, which is adapted to form a part of a filter medium using particles initially retained by the filter, and which is particularly designed so as to absorb little if any of the substance from which the contaminants are filtered.

While capable of other uses, filters according to the present invention are advantageously used to separate and retain impurities from the solvent used in parts washers of the type in which cleaning solvent is continually pumped from a reservoir and directed over parts received in a sink or other retainer, and wherein the solvent thereafter is filtered somewhat and permitted to return to the reservoir to await eventual recirculation.

In one form of parts washer, namely, parts washers of the type described and claimed in U.S. Pat. No. 3,522,814, solvent filtration and cleaning has generally been accomplished by permitting the solvent to flow over a mass of cotton waste held on a perforated, filter-retaining horizontal wall forming a part of the washer unit. This concept has the advantage of fairly effective filtration, economy, and ease of service. However, as solvent has become significantly more costly in recent times, as filter material has become less readily available, and as the convenience of the customer being serviced has become more important, the various types of filtration apparatus and methods used in the prior art may be seen to be capable of further improvement.

Thus, for example, whereas cotton waste material was commonly available in the past for very low prices, and whereas such material was effective because of the natural absorbency of cotton, this situation has changed in two important respects. First, pure cotton waste is no longer readily available, because, whereas cotton was used almost exclusively in the past for many articles of clothing, for toweling and rags, etc., this is no longer the case. Today, almost all articles containing cotton also contain significant portions of synthetic fibers, such as fibers of nylon and fibers of various polyester and acrylic materials. Accordingly, such materials lack consistency and the ability of pure or almost pure cotton to absorb impurities from the solvent.

Secondly, while many parts washers in the past were serviced by removing and throwing away the cotton waste, and removing the solvent for discarding or reclamation, the price of solvent today is so high that reclamation thereof is economically desirable and the waste thereof occasioned by solvent absorption within cotton fibers is economically disadvantageous.

Still further, users of parts washers have become increasingly aware of fire and inhalation hazards caused by leaving solvent-filled filter rags on or about the premises of the parts cleaners users. Accordingly, there has been a need for an improved filter and filtration systems which is especially adapted to meet the needs of parts washers users of today.

Accordingly, an object of the present invention is to provide an improved filter assembly.

A further object is to provide a filter unit of a type having significant particle-retention capability, but little or no absorptive capacity.

A further object is to provide a filter having a plurality of openings of a graduated size, and adapted to permit retention of filtered material by the smaller openings and ready passage of fluid through larger openings.

Another object is to provide a filter which will retain particles of dirt or the like, both by reason of screen opening size and by reason of settling or sedimentary action.

A further object is the provision of a filter adapted to employ, as a part of the filter medium, certain of the particles initially received and retained by the filter itself.

Yet another object is to provide a filter particularly adapted for use in cleaning fluids which are continually recirculated, and which often intermittently present to the filter varying loads of material to be removed by filtration.

Still another object is to provide a filter having a neck portion preformed for ready reception in an open drain or like opening, and also capable of being deformed or folded for ready removal.

A still further object of the invention is to provide a filter of a flexible but non-extensible material, and particularly a filter adapted to present a large interior volume, with filter openings on the exterior thereof only.

Another object is to provide a filter having a series of openings which increase in size as they are more remotely spaced from the bottom of the filter.

The foregoing and other objects are accomplished by providing a filter assembly having a neck portion including a relatively rigid collar defining a filter inlet opening, a flexible, bag-like body portion of enlarged volume, a plurality of holes or openings at varying size, with the openings disposed nearest the bottom of the body, with such body being in the form of a perforated but otherwise impermeable, flexible sheet material, whereby a medium to be filtered and passing repeatedly through the filter body will be cleaned by entrapment of particles retained by the smaller opening and by sedimentation of particles from the liquid retained in said filter body.

The exact manner in which the foregoing and other objects and advantages of the invention are carried into practice will become more clearly apparent when reference is made to the following detailed description of the preferred embodiments of the invention set forth by way of example, and shown in the accompanying drawings, wherein like reference numbers indicate corresponding parts throughout the several figures.

BRIEF DESCRIPTION OF THE DRAWINGS

FIG. 1 is a front elevational view of a parts washer of the type in which filters of the present invention are advantageously used;

FIG. 2 is an enlarged fragmentary view of a part of the parts washer of FIG. 1, showing a filter according to the invention disposed in its position of use within the parts washer and further showing, in phantom lines, the position of the bag as it is being inserted or removed;

FIG. 3 is a fragmentary top plan view showing the collar portion of the filter assembly;

FIG. 4 is a side elevational view, on an enlarged scale, showing the filter assembly of the invention; and FIG. 5 is an end view of the filter element in one position of use.

DESCRIPTION OF THE PREFERRED EMBODIMENTS OF THE INVENTION

While it will be understood that the filter assembly of the invention is capable of other and further uses, a detailed description will be made of a form of a filter unit which is adapted to be inserted into the filter carrier of a parts washer unit through the sink drain opening thereof, and to be retained in place with the upper part thereof received by the drain opening. The filter is further adapted for removal through the drain opening following folding or crumpling of the filter bag after it has served its purpose.

Referring now to the drawings in greater detail, FIG. 1 shows a parts washer, generally designated 10, of the type which advantageously uses the filter assembly of the invention. The parts washer unit 10 includes a sink 12, with associated parts, removably received over a receptacle in the form of a barrel 14 or the like, from which a supply of solvent is recirculated and directed, as by the conduit 16, over parts received in the sink 12. Further details of one form of parts washer with which the filter of the invention may be used appear in U.S. Pat. No. 3,522,814.

Referring now to FIG. 2, the filter assembly 18 of the invention is shown to be received in a position of use within a housing generally designated 20, with the housing including a locating flange 22, sidewalls 24 and a perforated bottom wall portion 26. The flange 22 or other portion of the filter housing 20 is preferably, but not necessarily, attached to the bottom wall 28 of the sink 12. The margins of an opening generally designated 30 are defined by a flange 32 which is offset from the plane of the sink bottom wall 28.

In its position of use, the filter assembly 18 will be seen to include a body portion 34 having a plurality of openings 36 and an inlet area generally designated 38. FIG. 2 shows that the inlet opening 38 lies within the sink opening 30 and that the lower portion of the body 34 normally rests on the perforated bottom wall 26 of the housing 20.

Referring now to FIGS. 3, 4 and 5, it will be noted that the filter inlet 38 is defined by a relatively rigid collar assembly 40 which includes a generally radially extending flange 42 and a generally axially extending flange 44. A slot or gap is defined between slightly spaced apart end portions 46, 48, permitting the collar 40, which is preferably of a relatively stiff but resilient plastic material, to accommodate variations in the size of the opening within which it is received, and may also permit the collar 40 to exert a moderate, radially outwardly directed spring force against the edges of the sink opening flange 32 thereby helping to hold the filter assembly 18 in place within the sink opening 30. Additional means for this purpose are described elsewhere herein.

As shown further in FIGS. 4 and 5, the upper margins 50 of the filter body 34 are heat sealed or otherwise bonded to the collar 40. The filter body 34 is a bag-like structure preferably made of flexible but generally non-extensible material, such as polyethylene, other plastic material, or the like. The end 52 of the body 34 may be formed by heat sealing the edges thereof together, or by any other known technique.

As will be noted by reference to FIG. 4, an important feature of the invention is that the openings 36 lying nearest the bottom of the bag, in a region generally designated 52, are of a small size in relation to the series of openings disposed above them and lying in an upper middle region generally designated 54. The uppermost set of openings 36 is located in a region generally designated 56, and these openings are the largest sized openings.

In one preferred form of apparatus, the openings in the region 52 are from about 0.025 to 0.040 inches in diameter, those openings in the region 54 are from about 0.062 to about 0.090 inches in diameter and those in the uppermost region 56 may be as large as from about 0.160 to 0.200 inches in diameter.

The lowermost openings are much more numerous and are closely spaced apart than are their counterparts in the upper rows or areas 54, 56, with the larger openings being in each case farther spaced apart than the smaller openings lying in adjacent rows.

Referring now to FIG. 2, it will be noted that, in one form of the invention, a "crumb cup," screen or small parts retainer generally designated 58 is provided. This unit 58 includes margins 60 which overlie the flange 42 of the filter 18, and which are sized also for reception partially within the sink opening 30, help position and retain the collar 40.

Referring now to the use of the filter, it will be assumed that the parts washer 10 is about to be placed in service, and that the sink 12 has been placed over the drum 14. Thereupon, the crumb cup or strainer 58 is removed, the filter assembly 18 is inserted, as by moving it from the phantom line position of FIG. 2 into the solid line position thereof, with the body 34 being crumpled or folded and then being passed through the opening 30. The unit is positioned so that the radial flange 42 of the collar 40 rests on the sink flange 32. In this position, the lower portion of the body 34 of the filter assembly 18 rests on the bottom wall 26 of the housing 20. The strainer or crumb cup 58 is then replaced in the opening 30 with the cup margin 60 overlying the flange 42 and sandwiching it between the cup flange 60 and the sink flange 32.

After the parts washer unit has been in use for a suitable period of time, it is customary to discard the filter, along with the impurities accumulated therein, and then to fill the solvent barrel with a charge of new or reclaimed solvent. This is carried out by removing the cup or strainer 58 and removing the bag-like body 34 of the filter unit 18 by folding or crumpling it and pulling or lifting it from the housing 20 through the opening 30. Because of the flexible character of the bag, and because the openings will not permit solvent to be retained in the filter 18, the bag contains only the material trapped by the filter. Thereafter, a new filter element is inserted, and the cycle may be repeated. In most instances, the filter bag, together with its contents, is merely discarded on the site at which the parts washer is used, inasmuch as it is relatively dry and contains little if any residual solvent to create a hazard of fire or evaporation.

Referring now to certain characteristices of the filter and the use thereof, it will be noted that most parts washers are ordinarily used intermittently, and that upon initial washing of the part, dirt and debris of various kinds are separated therefrom, with the larger pieces of separated material normally being dislodged from the part first. These particles of dirt, which may include chips, filings, shavings, sand, mud and the like, pass into the filter body. Continued washing of the part usually successfully dislodges smaller particles of such materials. Consequently, when the filter is first used, the solvent entraps large particles of impurities, and these particles may stop up or clog a number of the openings 36 in the lower rows 52 of body perforations. In this event, solvent continuing to flow into the bag will normally be discharged through the openings 34 in the intermediate rows 54. In those extreme cases where some or all of these second-line openings in the region 54 may be blocked, the large openings, such as those in the area 56, provide sufficient flow-through capacity that the solvent will never back up into the sink 12.

As parts washing continues, those particles remaining in the body of the filter 34 continue to be subject to the action of any solvent remaining in the bag, and such particles may be subdivided so as to pass through the filter, also, dirt closing off some of the smaller openings may be placed in solution by the passage of time. This increases the flow through the lower portion of the filter, but such flow does not occur until the particles have been subdivided and/or the dirt or other impurities dissolved.

A further operating characteristic feature of the invention is that, when the smaller holes become clogged, vertical flow through the filter is reduced or eliminated, and a settling or sedimentary action occurs in respect to impurities in the solvent retained in the filter body 34. This also decreases the likelihood that undissolved or large impurities will pass through the filter.

Referring now to another feature of this filter unit, it has been quite surprisingly found in operation that the unit provides an effective filtration which is much finer than the filtering action which would be accounted for merely by the relatively large size of the openings 36.

Although the invention is not intended to depend upon particular theory of operation to explain its effectiveness, and although the exact reasons for its success may not be known with certainty, it is believed probable, that, because of the flexible nature of the filter body 34 and because of the types of parts normally cleaned by the solvent, the openings 36 entrap particles having at least one dimension which is much smaller than the opening diameter. When this occurs, the result is to reduce the effective size of the opening and thus create a finer mesh filtering action.

Thus, various slivers, shavings and the like have often been found lodged cross-wise in respect to the openings 36 in the filter body 34, and it has been found that these particles tend to restrain further passage through the filter of particles of similar size, such action often creating interstices which allow passage of liquid but which have an effectively much smaller mesh size than that provided merely by the openings themselves. It is also thought that, by reason of the soft, flexible texture of the bag, which may be still further softened or plasticized by solvent action, sharp particles tend to be entrapped both in the vicinity of the openings and along the surfaces of the filter body itself.

Thus, sharp slivers, filings and other contaminants sometimes seem to become embedded in the surface of the plastic filter body.

This is in contrast to the situation presented by a filter having a hard surface, such as a steel or other metal surface, a ceramic surface, or other hard, smooth, non-absorptive surface. It is thought that in filters of the latter type, the particles may tend to remain suspended in the fluid until they become aligned so as to be able to pass through the openings rather than being stopped thereby.

On the other hand, filters of the type using absorptive materials, such as cloth or paper, are effective as filters for such fine particles, but these absorptive materials retain undesirably large amounts of solvent within the fibers, thus tending either to be wasteful of solvent, or creating a disposal hazard, or both.

When considering the foregoing it must also be borne in mind that, inasmuch as the solvent used in these parts washers is eventually to be reclaimed, exceptionally fine filter action is not required or even desired, especially where such action must be achieved by sacrificing speed of filtration. In this connection, it will be realized that the pump forming a part of the parts washer circulates a high volume of solvent, and may operate either intermittently or continuously. Thus, a satisfactory filter is one which readily passes large volumes of solvent within a short time.

Accordingly, the present invention solves the problem of economically providing a filter which is disposable, the makeup of which is not dependent upon uncontrolled factors (such as the content of rag supply), which can provide high volume filtration and bypass capacity, without moving parts, such as bypass valves, etc., which takes advantage of sedimentation and solvation, and which does not itself absorb measurable quantities of solvent. Moreover, the filter is readily removed and replaced and is easily and accurately positioned for proper performance. It may be discarded on the premises wherein the parts washers is used without danger.

It will thus be seen that the present invention provides a novel filter unit having a number of advantages and characteristics, including those referred to specifically herein, and others which are inherent in the invention. It is anticipated that, a representative embodiment only having been shown by way of example, various modifications and changes to the form of the device described will occur to those skilled in the art, and such changes may be made without departing from the spirit of the invention or the scope of the appended claims.

I claim:

1. A parts washer apparatus comprising in combination a receptacle for receiving a solvent and having means therein for accommodating the parts to be washed and a reservoir for containing a quantity of the solvent, means for circulating the solvent from said reservoir to said receptacle, said receptacle having an opening providing communication for passage of said solvent between said receptacle and said reservoir, and a filter unit disposed within said opening, said filter unit including a collar element in the form of a ring substantially rigid material for locating said filter unit within said opening, and a filter bag portion formed of an impermeable and softenable plastic material, said filter bag having a neck portion secured to said collar element and enlarged upper and lower body portions depending therefrom, said neck portion having solvent by-pass openings therein and said upper and lower body portion having openings therein which are of smaller size than said solvent by-pass openings, said filter bag having openings of the smallest size in said lower body portion which openings are sufficiently small to retain in said bag very fine particles of solid material which are suspended in said solvent, said openings in said upper body portion being of size sufficient to retain in said bag larger particles of said material which are carried by said solvent, said openings being adapted to be reduced in size by particles of said solid material lodging therein, whereby to provide a further effective subdivision of said openings by said particles of material so that said filter mesh size is effectively reduced as filtered particles are trapped therein, and the rate of solvent passage through the lower body of said filter is reduced sufficiently to enable said filter to separate said material by sedimentation.

2. A parts washer apparatus as set forth in claim 1 wherein said filter unit is confined in a housing surrounding said receptacle openings and having a bag supporting wall with associated drainage means spaced from said receptacle opening and said filter bag being dimensioned so that the bottom of said filter bag will rest on said wall when said filter bag is expanded by the flow of materials through the same.

3. A filter unit for incorporation in a parts washer assembly having a receptacle for receiving solvent and for accommodating parts to be washed with said solvent, and a reservoir for containing a quantity of the solvent, with means for circulating the solvent from the reservoir to said receptacle for application to parts therein, said receptacle having a drain opening leading to said reservoir, said filter unit including a relatively rigid collar portion of a size for reception within said drain opening and a filter body in the general form of an elongated bag made from a flexible and impermeable, non-extensible sheet material, said bag having a neck portion with the upper margins thereof secured to said collar, said neck portion having a plurality of large by-pass openings which are spaced from one another, an enlarged upper filter body portion disposed below said neck portion and having a plurality of openings therein spaced vertically and horizontally from one another, and a lower body portion lying beneath said upper body portion and having a plurality of openings therein, said openings in said lower body portion being spaced vertically and horizontally from one another, with said openings in said lower body portion being substantially smaller than those openings in said intermediate body portion, and said openings in said intermediate body portion being substantially smaller than the openings in said neck portion, said openings in said lower body portion being of a size sufficiently small enough to retain in said lower body portion very fine particles of material suspended in said solvent while passing said solvent, said openings in said intermediate body portion and said neck portion, respectively, being of size sufficient to retain in said body portion particles of material of larger size which are carried by said solvent, said filter unit, when positioned so that said filter body extends from said drain opening, passing the solvent through said openings while retaining in said body substantial quantities of particles of solid material and said filter body openings being adapted to be partially or wholly closed by solid particles entrapped therein as solid particles accumulate in said filter body so that a finer mesh filtering action results.

4. A filter unit as defined in claim 3 wherein said neck openings are from about 0.160 to about 0.200 inches in diameter, said intermediate openings are from about 0.062 to about 0.90 inches in diameter, and in which said openings in said lower body portion are from about 0.025 to about 0.040 inches in diameter.

5. A filter unit as defined in claim 3 wherein said filter body is formed of a plastic material which is substantially impermeable to the solvent employed but is able to be softened by said solvent, whereby particles suspended within said solvent having sharp edges may be imbedded within and along the surface of said body, and securely lodged within the smaller openings of said filter body with the particles entrapped within said lower body openings providing an effectively reduced mesh filter with a lower rate of solvent passage therethrough.

* * * * *